United States Patent
Bigley

[11] Patent Number: 5,394,967
[45] Date of Patent: Mar. 7, 1995

[54] CONNECT/DISCONNECT MECHANISM FOR A VEHICLE DRIVE TRAIN

[75] Inventor: Jon A. Bigley, Milwaukie, Oreg.

[73] Assignee: Warn Industries, Inc., Milwaukie, Oreg.

[21] Appl. No.: 17,235

[22] Filed: Feb. 12, 1993

[51] Int. Cl.⁶ .................... F16D 1/06; F16D 11/04
[52] U.S. Cl. .................... 192/67 R; 192/49; 192/54; 192/93 R; 403/1
[58] Field of Search ............... 192/67 R, 31, 35, 36, 192/49, 54, 93 A, 93 R; 403/1

[56] References Cited

U.S. PATENT DOCUMENTS

| | | | |
|---|---|---|---|
| 3,217,847 | 11/1965 | Petrak | 192/67 R X |
| 3,348,645 | 10/1967 | Sigg | 192/67 R |
| 3,656,598 | 4/1972 | Goble | 192/67 R X |
| 3,669,476 | 6/1972 | Wilson | 192/67 R X |
| 3,910,131 | 10/1975 | Richards | 192/67 R X |
| 4,116,320 | 9/1978 | Quilliam | 192/67 R |
| 4,192,411 | 3/1980 | Fogelberg | 192/67 R X |
| 4,266,646 | 5/1981 | Telford | 192/67 R |
| 4,269,294 | 5/1981 | Kelbel | 192/67 R X |
| 4,281,749 | 8/1981 | Fogelberg | 192/67 R X |
| 4,282,959 | 8/1981 | Schachner | 192/67 R X |
| 4,327,821 | 5/1982 | Telford | 192/35 |
| 4,470,491 | 9/1984 | Teraoka | 192/35 |
| 4,557,358 | 12/1985 | Petrak | 192/35 |
| 4,694,943 | 9/1987 | Petrak | 192/35 |
| 4,711,332 | 12/1987 | Schuster | 192/36 X |
| 4,718,527 | 1/1988 | Kurihara | 192/54 |
| 4,811,824 | 3/1989 | Kurihara | 192/35 |
| 4,854,434 | 8/1989 | Kurihara | 192/35 |
| 5,044,479 | 9/1991 | Petrak | 192/49 |

FOREIGN PATENT DOCUMENTS 4-15322  1/1992  Japan .............. 192/67 R

OTHER PUBLICATIONS

SAE Technical Paper Series 821261 Ranger/Bronco Automatic Hub Locks.

Primary Examiner—Andrea L. Pitts
Attorney, Agent, or Firm—Robert L. Harrington

[57] ABSTRACT

A hub locking mechanism for a wheeled vehicle is provided for selectively coupling and uncoupling driving and driven members. A clutch ring is in permanent engagement with one of the members and is axially moveable to engage the other member. Engagement of the clutch ring and the engageable member is enhanced by the provision of tandem rows of engaging formations on the clutch ring and the engageable member. The mechanism for affecting movement of the clutch ring has an improved one piece friction shoe for the moving cam and an improved cage enclosing the clutch ring and actuating spring.

14 Claims, 6 Drawing Sheets

CONNECT/DISCONNECT MECHANISM FOR A VEHICLE DRIVE TRAIN

FIELD OF THE INVENTION

This invention relates to an interlock mechanism applied between drive components of a vehicle's drive train and more particularly to a mechanism that is controllably shifted between positions for connecting and disconnecting the drive components and thereby rendering selected wheels passive or power driven.

BACKGROUND OF THE INVENTION

This invention has particular application to four wheel drive vehicles wherein the front wheels or the rear wheels are engaged to be driven by the drive train only as required. For purposes of discussion, the front wheels will be referred to as the set of wheels that are selectively engaged to be driven by the drive train. A transfer case coupled to the transmission has suitable gearing to be engaged or disengaged as needed by simply shifting a lever. The engagement of the transfer case gearing supplies power to the front drive train which will drive the front wheels. It is of course desirable to be able to engage the front wheels with the front drive train when the front drive train is under power and to disengage the wheels when the front drive train is idle. The disengagement of the front wheels from the drive train prevents forced rotation of the drive train as a result of the front wheels being driven as the vehicle is propelled.

It will thus be appreciated that in the example given there are two positions in the drive train whereat a connect/disconnect mechanism is required. This invention may be applicable to both positions as well as to other positions of connect/disconnect components that may exist in alternate design configurations. For purposes of explanation, the invention will hereafter be considered for application between a front wheel axle and the corresponding front wheel hub.

Generally, an axle of the drive train, a clutch ring and wheel hub (on which a wheel is mounted) are concentrically mounted to the vehicle. The axle is received within the clutch ring and the clutch ring is in turn received within the hub. A non-circular form such as splines or teeth, hereafter referred to as splines, are provided on the periphery of the axle, on the interior and exterior of the clutch ring and on the interior of the hub. The clutch ring splines are engaged at all times with either the splines of the axle or splines of the wheel hub. The clutch ring is axially movable along the concentric axis to be in engagement with both members or to be in engagement with only one member. The clutch ring moved to engagement with both members "locks" the wheel hub and the drive axle rotatively to each other.

A shift mechanism is provided for moving the clutch ring axially along the concentric axis to a position of engagement with both the drive axle and the hub and to a position where the clutch ring is engaged with only one of the members. The clutch ring is moved along the splines of the member to which it is permanently engaged.

One of the problems encountered with this arrangement is in moving the clutch ring to a position to be engaged with both members. Rarely are the splines of the clutch ring and the splines of the other member aligned to permit ready engagement. Thus the shift mechanism incorporates a biasing member, such as a spring, which is compressed and which affects movement of the clutch ring when the splines of the clutch ring and the splines of the engageable member become aligned. When torque is applied, that is when the axle and hub are rotated relative to each other, the splines will become momentarily aligned and the compressed spring will urge the clutch ring into engagement. The continuously applied torque and the urging of relative rotation will however create a frictional force between the engaging splines that exceeds the biasing force of the spring thus limiting the engagement of the splines of the clutch ring and the engageable member to a small degree of overlap.

The driving torque as between the axle and the wheel is applied only at the overlap of the splined ends which is minimal. This minimal overlap has been largely successful, however repeated shifting of the clutch ring under these conditions will eventually wear away the ends of the splines which will result in chattering or prevent engagement of the clutch ring with the engageable member.

The above problem of shifting the clutch ring into engagement exists with either the manual or automatic actuation of a hub clutch interlock and at any position in the drive train where interlock is achieved while the drive component is rotating and under torque. The problem of the interlock was initially resolved for a cam actuated automatic hub lock and further problems were encountered and resolved with respect to that specific application. As concerns the cam actuated interlock system of the illustrated embodiment, a fixed cam is provided that is non rotative with respect to either the axle or the hub. A cam follower which is movable axially to affect movement of the clutch ring is mounted on the axle in a non-rotative but sliding manner. A biasing spring is disposed between the cam follower and the clutch ring. Upon rotation of the axle, the cam follower is forced to move axially along the axle, thus urging the clutch ring into the engaged position via the spring disposed between the follower and the clutch ring. As was previously described, engagement occurs upon alignment of the splines of the clutch ring and the splines of the engageable member. An opposing spring is provided to urge the clutch ring out of engagement when rotative torque is no longer applied to the axle.

As simple as the above sounds, there are a number of components required to successfully perform this operation. A moving cam member is provided that is mounted strategic to the fixed cam and cam follower. The moving cam member urges further movement of the cam follower and maintains the cam follower separated from the fixed cam. The moving cam must rotate, but in order to perform the function must have a resistance to rotation. This has been accomplished by a complex yieldable braking mechanism that is expensive and subject to rapid wearing.

In a more specific form of automatic actuation, where the clutch ring is permanently splined to the wheel hub, the cam follower does not simply act against the actuating spring. A cage member is provided that encloses the actuating spring and the clutch ring. The spring is compressively movable within the cage and the clutch ring is slidably moveable within the cage. The cage has legs or rails that extend through the tooth form of the splines of the clutch ring and are connected to the opposite end of the cage.

The opposite end of the cage engages the spring that is provided to urge the clutch ring out of engagement. Movement of the cam follower to affect engagement of the clutch ring thus forces movement of the cage to compress the opposing spring to eliminate its resistive force. The cage applies a force to the clutch ring via the engaging spring to urge the clutch ring into engagement. The spring will of course compress if the splines of the clutch ring and the axle are out of alignment. The other end of the cage (on the other side of the clutch ring) engages the opposing spring and compresses the opposing spring to eliminate the resistance of the opposing spring and allow a more rapid movement of the clutch ring when the gear splines are aligned.

The cage member rotates with the clutch ring and during periods of engagement and disengagement, there is relative rotative movement as between the cam follower and cage end and this relative movement applies a torque at the point of connection as between the end of the cage in abutment with the cam follower and the rails of the cage that extend to the other end. Heretofore the cage has been constructed in a manner which required a snap fit connection of the rails to the end of the cage in abutment with the cam follower and that snap fit connection, being subjected to the rotative torque, would frequently break.

BRIEF SUMMARY OF THE INVENTION

The present invention addresses the three problems as related above. That is, the ends of the splines that effect engagement as between the axle and clutch ring, or hub and clutch ring, are subjected to high stress loads and can fail; the moving cam assembly requires a complexity of components; and the cage end connection to the rails can fail under rotative torque load.

In accordance with one embodiment of the invention, a hub lock is provided for selectively locking a wheel hub rotatively to a drive axle. A drive axle, a clutch ring and a wheel hub are concentrically mounted with the drive axle received within the clutch ring and the clutch ring in turn is received within the wheel hub. The clutch ring is permanently engaged with the wheel hub, the clutch ring having splines extending on its periphery in engagement with inwardly projecting splines of the wheel hub. The clutch ring is axially movable within the wheel hub, the splines of the ring and hub being engaged throughout its travel limit. A shift mechanism is provided for moving the clutch ring into and out of engagement with the axle, i.e., connect and disconnect the hub and axle.

The improvement comprises a clutch ring with tandem rows of splines (at least two sequentially spaced rows of splines) formed on its interior that become engaged with tandem rows of splines provided on the axle when the clutch ring is moved to a position of axle engagement. The engagement of the two rows of splines of the clutch ring with the two rows of splines of the drive axle doubles the contact surface as between the splines of the axle and the splines of the clutch ring as compared to a single row to single row engagement. Reducing the impact absorption by 50% has a profound effect on the wear rate of the spline ends and can increase the life of the mechanism as much as ten times. Nevertheless, the invention is not limited to two rows in tandem but may include three or more rows.

The tandem rows of splines may be applied equally as well to an arrangement where the clutch ring is permanently engaged with the drive axle and is movable to simultaneously engage the wheel hub. The tandem rows of splines are provided on the exterior of the clutch ring and the interior of the hub. These alternative arrangements are suited for all types of drive axle connect/disconnect applications within the power train of a vehicle.

The cam actuated automatic hub locks as illustrated herein has a mechanism integrated with the drive axle and the hub to automatically shift the clutch ring into simultaneous engagement with the drive axle and the wheel hub when a rotative torque is applied to the drive axle. In one embodiment, the clutch ring movement is affected in a known manner by a fixed cam, a moving cam and a cam follower in cooperation with biasing springs. One spring is provided to urge the clutch ring into engagement and the other spring is provided to urge the clutch ring out of engagement. The moving cam, in order to function must rotate but must resist rotation. Previously, a complex yieldable braking mechanism was employed to provide the resistance to rotation. The present invention employs a split cylindrical member coupled to the movable cam in contact with a fixed member such as a bearing retainer nut. The split arrangement of the member permits the diameter of the member to be reduced in dimension to frictionally engage the nut on which it is mounted. An endless spring wrapped around the periphery of the cylindrical member provides the force to collapse the member to the nut to provide the required resistance to rotation. The split cylindrical member replaces a plurality of brake shoes of the prior art device and significantly reduces the complexity.

The problem with the breakage of the cage end is largely reduced by providing the snap connection as between the rails and the other cage end. The one end is secured solidly to the rails as by welding and can withstand the applied torque. There is no torque applied as between the rails and said other end to cause failure of the snap connector at that end. A further modification is the elimination of the other cage end with the rail ends configured to hold the opposing spring (which rotates with the cage and thus does not involve relative rotation).

Refer now to the drawings and the detailed description for a complete understanding of the invention.

DESCRIPTION OF THE PREFERRED EMBODIMENT

Figure 1:
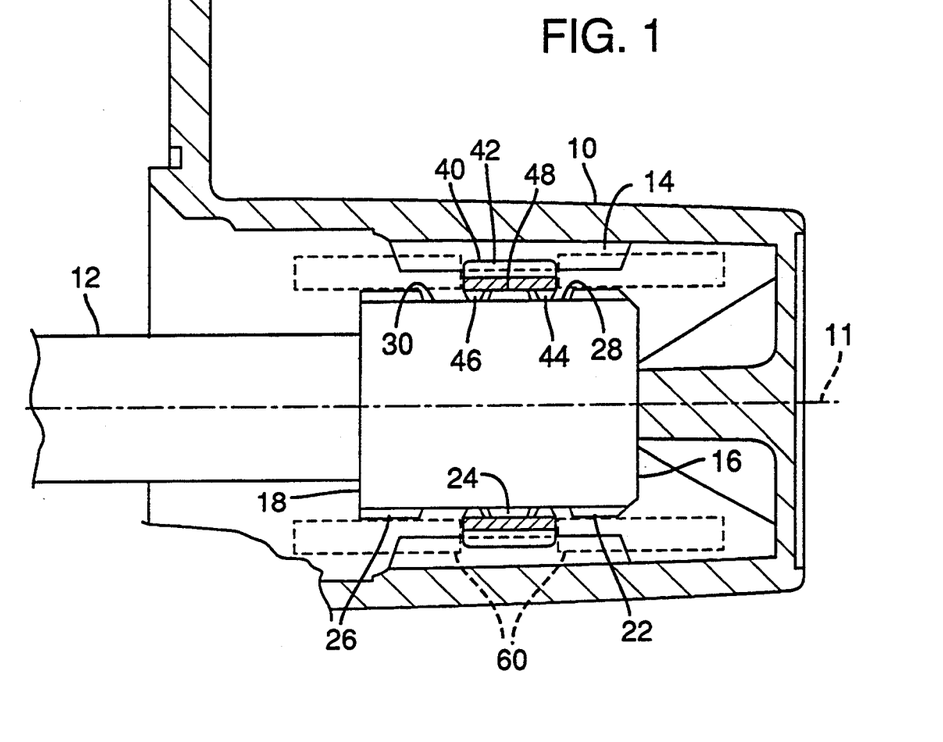
FIG. 1 is a sectional view of a hub lock of the present invention in an unlocked condition with parts removed for clarity.
Figure 2:
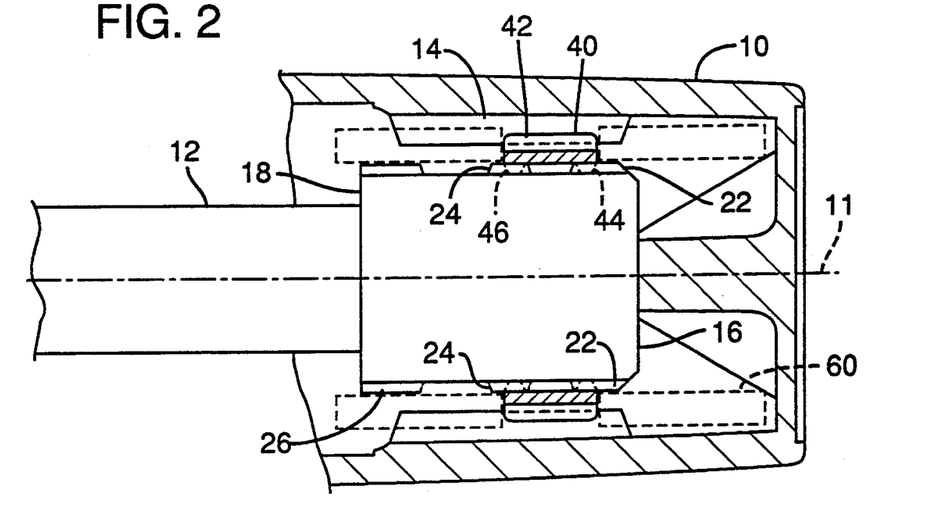
FIG. 2 is a sectional view of a hub lock of the present invention in a locked condition and otherwise similar to the view of FIG. 1.
Figure 3:
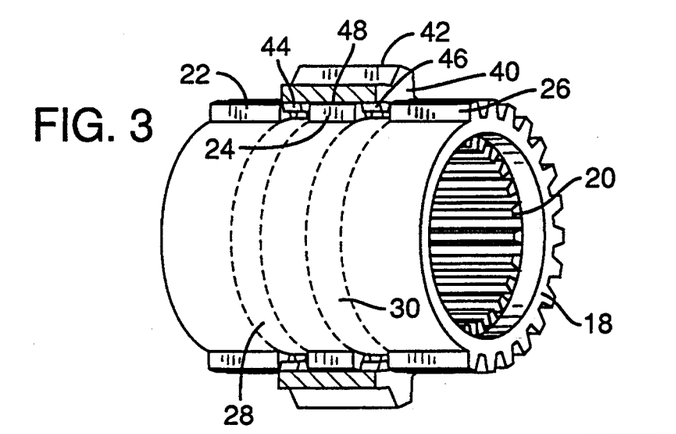
FIG. 3 is a perspective cut-away view of the clutch ring and inner gear of the hub lock of FIGS. 1 and 2.
Figure 5:
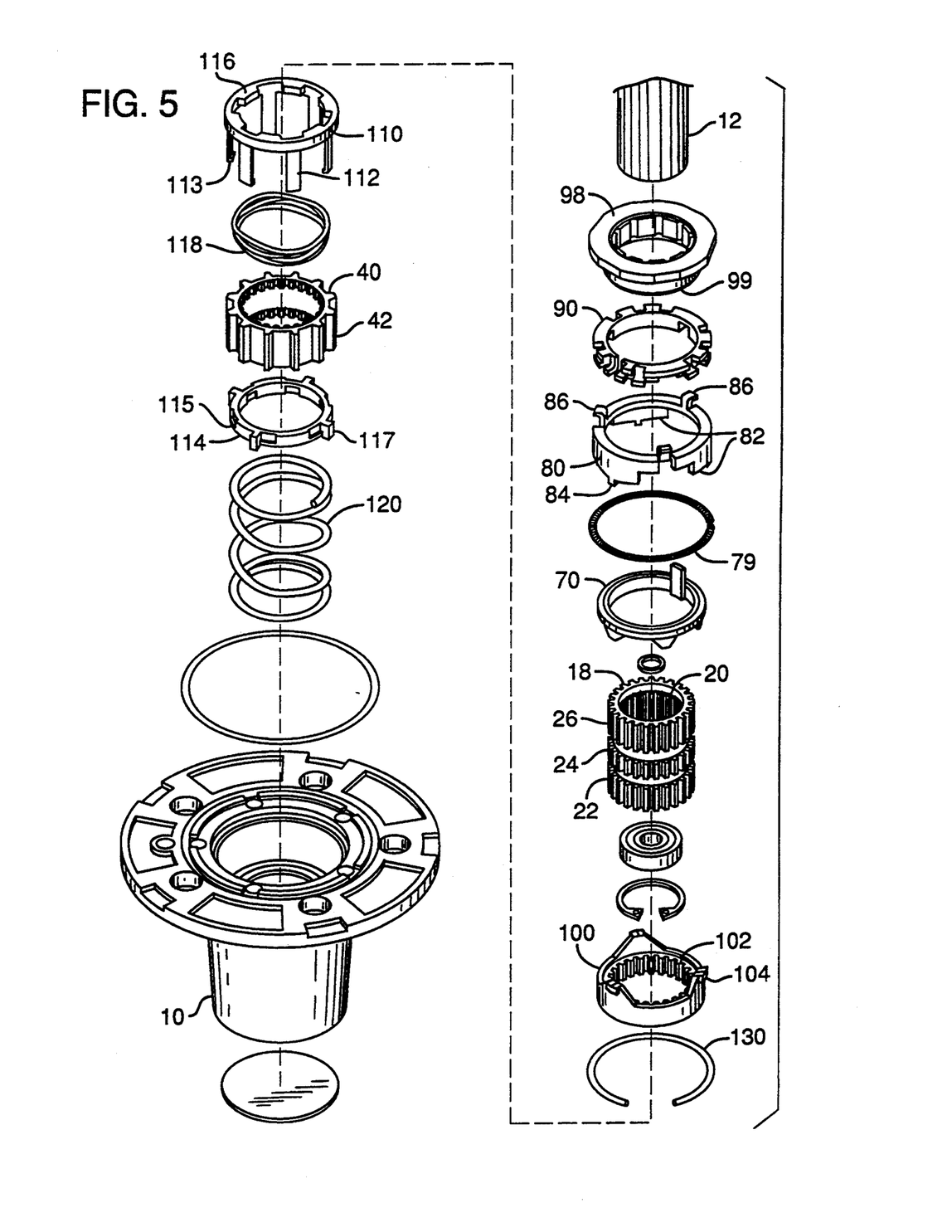
FIG. 5 is an exploded perspective view of an automatic hub lock of the present invention.

FIGS. 1 and 2 illustrate a portion of a wheel hub 10 having a vehicle drive axle 12 and a clutch mechanism received therein. The hub 10 has internal splines 14 formed on its interior that extend axially along a portion of its length. Splines 16 are provided on the periphery of the end of the axle 12 in a known manner and are of sufficient length to receive the inner gear 18. The inner gear 18, as best seen in FIGS. 3 and 5 is a cylindrical member having internal axial splines 20 and external axial splines 22, 24 and 26. Splines 22 are provided on one end of the gear 18 and splines 26 are provided on the opposite end. Splines 24 are positioned near the center of the gear 18 with a space 28 being provided between splines 22 and 24 and a space 30 being provided between splines 24 and 26. Splines 22, 24 and 26 are axially aligned. The inner gear 18 is mounted on the end of the axle 12 with the inner splines 20 of the gear 18 mating with the splines 16 of the axle 12. The inner gear 18 mounted on the axle 12 in effect becomes part of the axle and the assembly of the inner gear 18 on the axle 12 may be referred to as an axle. A clutch ring 40 (best seen in FIGS. 3 and 5) is a cylindrical member having external axially extended splines 42 and having internal splines 44 and 46 aligned one with the other. Splines 44 are provided at one end and splines 46 are provided at the other end of the clutch ring 40 with a space 48 being provided between splines 44 and 46. Referring once again to FIGS. 1 and 2, the clutch ring 40 is received in the hub 10 with the external splines 42 of the clutch ring 40 mating with the internal splines 14 of the hub 10. The clutch ring 40 circumscribes the inner gear 18. The hub 10, the clutch ring 40, the inner gear 18 and the axle 12 are thus concentrically mounted and have a common axis of rotation 11.

The clutch ring 40 is slidably movable along axis 11, the splines 42 of the clutch ring 40 being in continuous engagement with the splines 14 of the hub 10. Movement of the clutch ring 40 in one axial direction couples or locks the hub 10 to the axle 12 to provide unity of rotation, and movement in the opposite direction uncouples the hub 10 from the axle 12.

Shift mechanism, indicated generally as 60, is provided to move the clutch ring 40 axially. Shift mechanisms are known for affecting movement of the clutch ring 40 and may be of the manual type, the semiautomatic type or the automatic type. The manual shift mechanism generally has a hub mounted dial that is rotated in one direction to move the clutch ring 40 in one axial direction and rotated in an opposite direction to move the clutch ring 40 in the opposite axial direction. Semi-automatic shifting mechanism is operably remote from the hub, e.g., in the cab adjacent the driving controls, and may include for example controlling devices to supply or withdraw fluid such as air to affect movement. Automatic shifting devices generally operate upon relative rotation as between the hub and the drive axle. When the axle is driven, the clutch ring is moved in one direction into engagement and when the drive axle is idle and the hub is rotated the clutch ring is moved in the opposite direction.

FIG. 1 illustrates the condition where the hub 10 is free to rotate independent of the axle 12. That is, the clutch ring 40 is engaged only with the hub 10, the splines 42 of the clutch ring 40 being in engagement with the splines 14 of the hub 10. The internal splines 44, 46 of the clutch ring 40 are received in the spaces 28, 30 of the inner gear 18 and the splines 24 of the gear 18 are received in space 48 of the clutch ring 40. The hub 10 and the clutch ring 40 thus may rotate independent of the inner gear 18 and the axle 12.

FIG. 2 illustrates the condition where the clutch ring 40 has been moved axially by the shifting mechanism 60 to a position of engagement with both the hub 10 and the inner gear 18. As previously stated, the splines 42 of the clutch ring 40 are in continuous engagement with the splines 14 of the hub 10. The clutch ring 40 has been moved axially to a position where the splines 44 of the clutch ring engage the splines 22 of the inner gear and splines 46 of the clutch ring 40 engage the splines 24 of the inner gear 18. There is a tandem engagement between the splines of the inner gear and the splines of the clutch ring. This is particularly important when the engagement results in a limited overlap of the engaging splines. The tandem arrangement doubles the contact area as between the engaging splines for the same degree of overlap as opposed to previous arrangements wherein there was a singular engagement of one spline with another.

Figure 4:
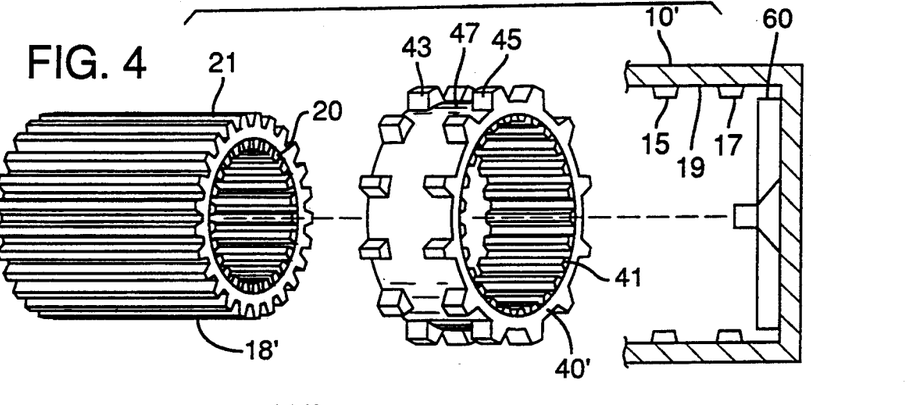
FIG. 4 is an exploded view showing an alternate embodiment of the hub, clutch ring and inner gear.

FIG. 4 illustrates an alternate arrangement of the hub, clutch ring and inner gear. The inner gear 18' has splines 20 provided on its interior in the same manner as on gear 18, and has splines 21 formed on its exterior that are axially aligned and extend substantially along its length. The gear 18' is mounted on the end of the axle 12 in the same manner as gear 18. The clutch ring 40' has internal splines 41 mateable with the splines 21 of the gear 18'. Splines 43, 45 are provided on the exterior of the clutch ring 40', splines 43 being provided at one end and splines 45 at the opposite end. The splines 43, 45 are axially aligned and are in a spaced apart relation, there being a space 47 between them. Hub 10' has internal splines 15, 17 that are aligned axially and one with the other. The splines 15, 17 are in a spaced relation, the splines 15, 17 being separated by a space 19. The clutch ring 40' is axially movable in the same manner as clutch ring 40 of FIGS. 2 and 3 Clutch ring 40' however is in permanent engagement with the inner gear 18' and is moved axially to either be in engagement with the hub 10' or out of engagement with hub 10'. A shift mechanism is provided to move the clutch ring 40' axially. The clutch ring 40' and hub 10' have tandem rows of splines that become engaged to lock the rotation of the hub 10' to the axle 12.

Figure 6:
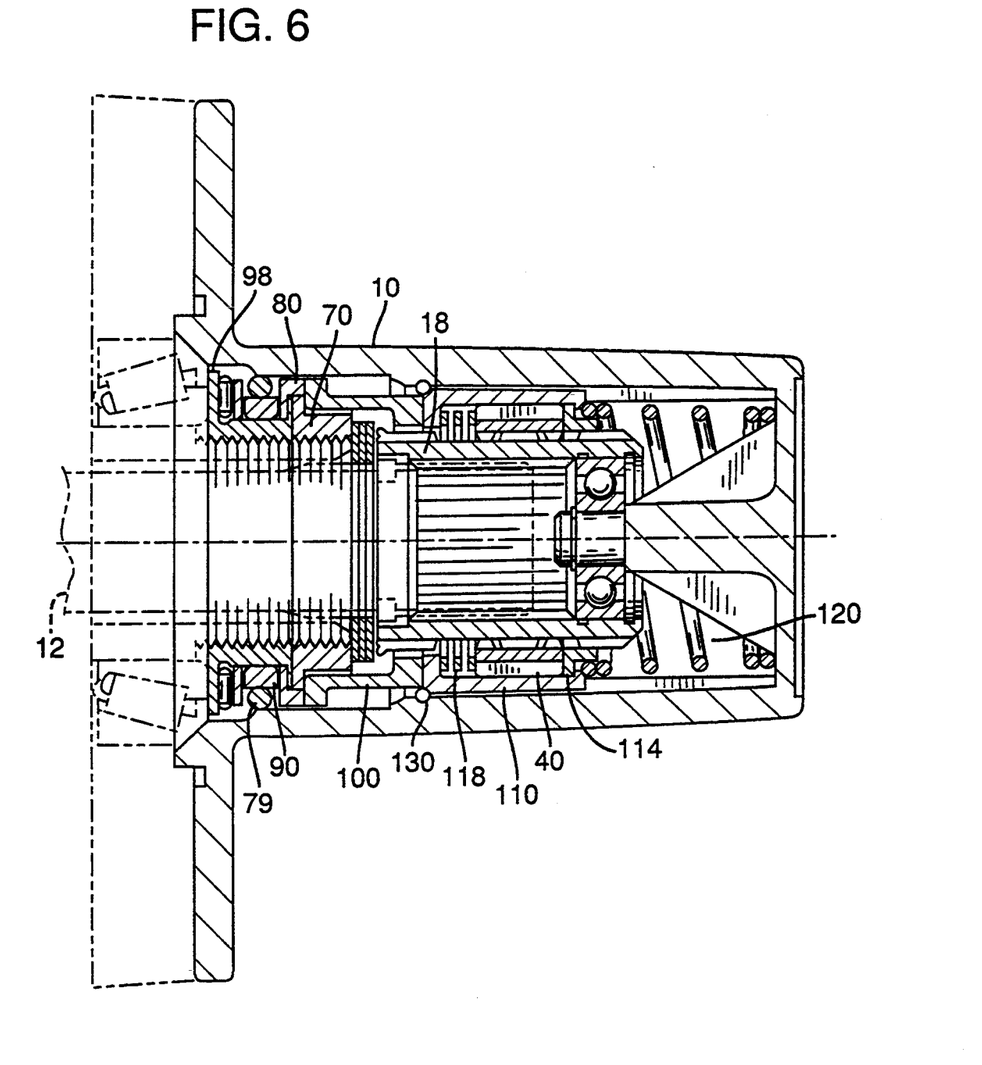
FIG. 6 is a sectional assembled view of the automatic hub lock of FIG. 5 in an unlocked condition.

The tandem arrangement of engaging splines is particularly suited to automatic hub locks that rely on rotation of the drive axle to affect movement of the clutch ring. FIG. 5 illustrates in exploded view an automatic hub lock employing a fixed cam, a moving cam and a cam follower to affect movement of the clutch ring. The automatic locking clutch is shown assembled in FIGS. 6 and 7. The operative function of the cam arrangement is as disclosed in U.S. Pat. No. 4,327,821 Telford issued May 4, 1982. The automatic hub clutch as will now be described is an improved version of '821 patent. Basically a fixed cam 70 is secured to the vehicle in a non rotative manner with respect to the drive axle or wheel hub. A moving cam 80 surrounds the fixed cam 70 and is rotatively coupled to a cylindrical friction shoe 90. The moving cam 80 and friction shoe 90 are rotatably mounted on a wheel bearing retainer 98. A cam follower 100 engages the fixed cam 70 and is in splined engagement with the inner gear 18, the follower 100 having internal splines 102 mateable with the splines 26 of the gear 18. The cam follower 100 is axially moveable on the inner gear 18. The cam follower is in abutment with a cage 110 that encloses a biasing spring 118 and the clutch ring 40. The clutch ring 40 is in splined engagement with the splines 14 of the hub 10. Rails 112 of the cage 110 are in splined engagement with the splines 42 of the clutch ring 40, thus the cage rotates with the clutch ring 40. An end 114 of the cage 110 is in abutment with one end of a return spring 120 with the opposite end of the return spring in contact with an interior end of the hub 10. The inner gear 18 is mounted on an axle 12 in splined engagement as previously described and the inner gear 18 is received in the clutch ring 40.

Figure 7:
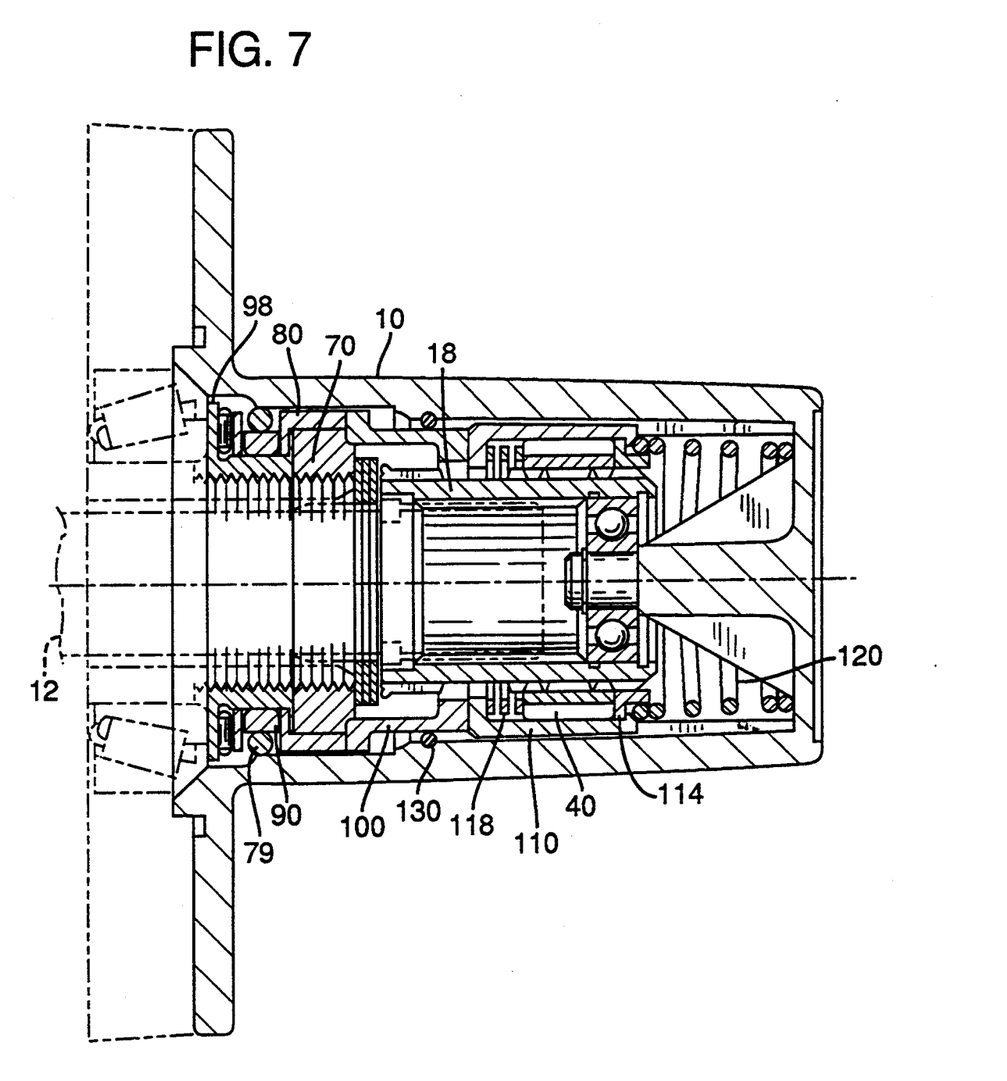
FIG. 7 is another sectional assembled view of the automatic hub lock of FIG. 5 in a locked condition.

Rotation of the axle 12 forces rotation of the cam follower 100, causing the cam follower to ramp up the lobes of the fixed cam 70 which causes the cam follower to move axially away from the fixed cam thus forcing the cage 110 to move axially. Movement of the cage 110 axially will urge the clutch ring 40 to move axially via the spring 118. (As the cage 110 moves axially, end 114 of the cage will compress the return spring 120 to remove its resistive force.) The clutch ring 40 will thus be urged into splined engagement with the inner gear 18 as shown in FIG. 7. As the cam follower 100 continues to rotate, extending posts 104 on the cam follower will engage the ramps 82 of the moveable cam 80 thus urging further axial displacement of the cam follower 100 which will separate the cam follower from the fixed cam 70. The extending posts 104 on the cam follower 100 will engage cam stops 84 on the moveable cam thus urging the moving cam to rotate with the cam follower.

Figure 8:
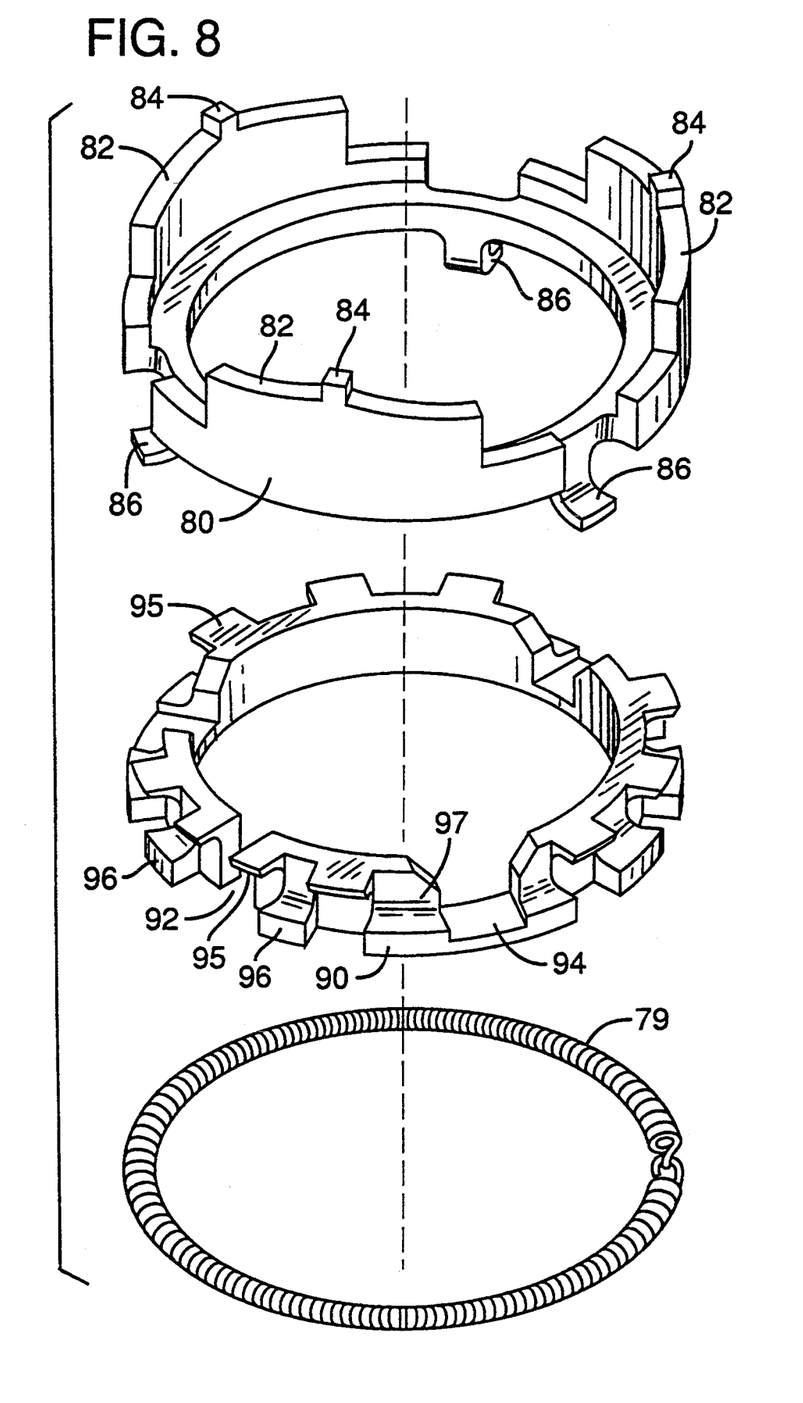
FIG. 8 is a perspective view of the friction shoe of the automatic hub lock of FIG. 5; and, FIG. 9 is a view of an alternate embodiment of the cage employed in the automatic hub lock of FIG. 5.

In order to function properly, the movable cam 80 must be rotatable but it must have a resistance to rotate. The resistance to rotate must be sufficient to force the cam follower 100 to ramp up the ramping surfaces 82 on the moving cam 80 until the cam stops 84 are engaged. An improved friction shoe 90, as illustrated FIG. 8, is provided to provide the necessary braking or rotative resistance. The shoe 90 is a formed cylindrical member sized to fit closely on the cylindrical surface 99 (See FIG. 5) of the wheel bearing retainer 98. A slot 92 is provided in the shoe 90 to permit reducing the diameter of the shoe 90 by closing the width of the slot. Radial grooves 94 are provided in the shoe 90 to receive protruding spring retainers 86 of the movable cam 80. Tabs 95 and bosses 96 extending radially outward around the periphery of the shoe 90 cooperatively form a channel 97 around the circumference of the shoe 90 for receiving an endless coil spring 79. The moving cam 80 is mounted to the friction shoe 90 with the spring retainers 86 being received in the radial grooves 94. The coil spring 79 is fitted in the channel 97, the spring 79 engaging the spring retainers 86 to secure the moving cam 80 and the shoe 90 together. The retainers 86 of the movable cam 80 engaging the grooves 94 will cause the cam 80 and the shoe 90 to rotate in unison. The assembly of the shoe 90 and the movable cam 80 are mounted on the bearing retainer nut 98. The spring 79 urges the shoe to reduce in diameter, in effect clamping the shoe 90 to the nut 98 to provide the required resistance to rotation. A braking device is thus provided that is of one piece construction and easily produced.

Relative rotation between the cam follower 100 and the cage 110 occurs as the hub 10 rotates relative to the axle 12. An applied torque is thus applied as between the cam follower 100 and the cage 110. There is little rotational torque applied when the cam follower is seated in the fixed cam and the clutch ring is not engaged with the inner gear. The cage is urged axially toward the cam follower by the return spring 120, however, a retaining ring 130 (See FIGS. 5, 6 and 7) fitted within the hub 10 limits the axial movement of the cage. The largest rotational torque applied as between the cage and the follower occurs as the cam follower 100 and the cage 110 are moving axially, that is during engagement of the clutch ring and during disengagement. During engagement, the axle is rotating relative to the hub and therefore the follower is rotating relative to the cage. The follower as it moves axially to affect engagement must apply a sufficient force on the cage to compress the return spring 120 and spring 118. The applied force results in a rotational torque since the cam follower is rotating relative to the cage. This rotational torque is applied to the end (base) 116 of the cage 110 and particularly at the connections between the end 116 and rails 112. The cage 110 (See FIG. 5) has the end 116 formed integral with the rails 112 to provide a structure that will sustain the rotational torque applied. End 114 is removably mounted on the ends of the rails 112. Tabs 113 formed on the end of the rails 112 fit in formed latches 115 on the end 114. Extending posts 117 on the end 114 are arranged to receive the end of the spring 120.

Figure 9:
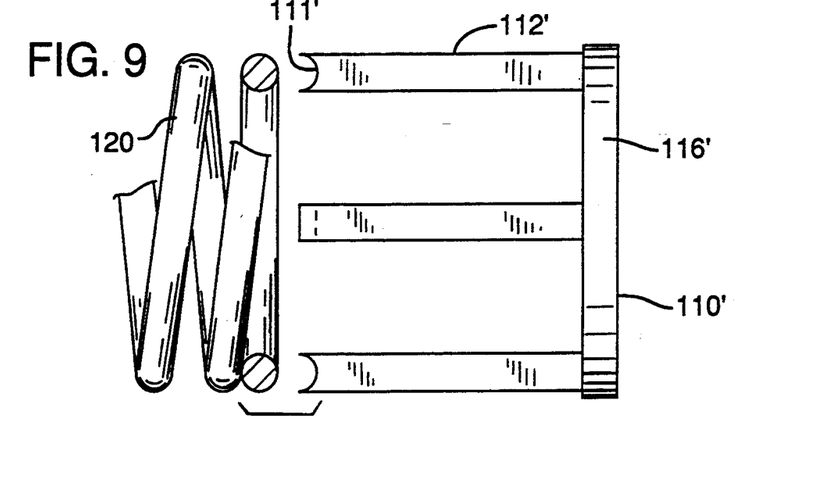

An alternate arrangement of the cage is illustrated in FIG. 9. A cage 110' has an end 116' integrally formed with the rails 112'. The rails 112' extend from the end 116' and have a spring receiving formation 111 formed on the extended ends. An end of the return spring 120 is received in the formations 111.

Those skilled in the art will recognize that modifications and variations may be made without departing from the true spirit and scope of the invention. The invention is therefore not to be limited to the embodiments set forth in the drawings and specification but is to be determined from the appended claims.

What is claimed is:

1. A connect/disconnect mechanism for a drive line of a vehicle comprising;
    a drive component and a driven component, both forming a part of a drive line of a vehicle, said drive component and said driven component rotatable around a common axis, splines provided on said drive component and said driven component,
    a clutch member between said drive component and driven component, first splines on said clutch member permanently engaged with the splines of one of said components, and having axial sliding movement relative thereto, and second splines on said clutch member engageable with the splines of the other of said components and having limited axial sliding movement relative thereto,
    said clutch member axially slidable between first and second positions and a shift member that selectively shifts said clutch member between said first and second positions,
    said second splines on said clutch member including at least two spline rows in tandem, spaces adjacent said spline rows being free of splines, and said splines on said other of said components including at least two spline rows in tandem and spaces adjacent said spline rows being free of splines, said second splines on said clutch member and said splines on said other of said components cooperatively arranged for inter-engagement of the two spline rows of the clutch member with the two spline rows of said other of said components with the clutch member in said first position to thereby connect the first and second components for cooperative mutual driving engagement of both spline rows of said clutch member with both spline rows of said other of said components, and said rows of splines being disengaged and located in the adjacent spaces with the clutch ring in said second position.

2. A clutch mechanism for selectively locking a wheel hub and a drive axle of a vehicle for unity of rotation and unlocking said wheel hub and said drive axle for independent rotation comprising:

a wheel hub;

a drive axle received in said wheel hub;

a clutch ring axially movable relative to said wheel hub and said axle, said clutch ring permanently coupled for unity of rotation with one of said wheel hub and said axle, said ring selectively coupled to other of said wheel hub and said axle to provide unity of rotation and uncoupled from other of said wheel hub and said axle to provide independent rotation by axial movement of said clutch ring;

first multiple formations arranged axially in spaced relation formed on said ring;

second multiple formations arranged axially in spaced relation formed on the other of said wheel hub and said axle and mateable to said first multiple formations; and said first multiple formations matingly engaged with said second multiple formations when said ring is moved axially to couple said ring to said other of said wheel hub and said axle for cooperative mutual driving engagement between all of said multiple formations of said ring and all of said multiple formations of said other of said wheel hub and said axle.

3. A clutch mechanism as defined in claim 2, wherein: said tandem formations formed on said other of said wheel hub and said axle are formed on said axle.

4. A clutch mechanism as defined in claim 2, wherein: said tandem formations formed on said other of said wheel hub and said axle are formed on said hub.

5. A clutch mechanism as defined in claim 2 wherein said first and second multiple formations are each at least two spline rows in tandem axially whereby said at least two spline rows of the first formation are interengaged with said at least two spline rows of the second formation in said first position.

6. A clutch mechanism for selectively locking a wheel hub and a drive axle of a vehicle for unity of rotation and unlocking said wheel hub and said drive axle for independent rotation comprising:

a wheel hub;

a drive axle received in said wheel hub;

a clutch ring axially movable relative to said wheel hub and said axle, said clutch ring permanently coupled for unity of rotation with one of said wheel hub and said axle, said ring selectively coupled to the other of said wheel hub and said axle to provide unity of rotation, and uncoupled from said other of said wheel hub and said axle to provide independent rotation by axial movement of said ring;

first multiple formations arranged axially in tandem formed on said ring;

second multiple formations arranged axially in tandem formed on other of said wheel hub and said axle and mateable to said first tandem formations;

a shift mechanism connected to said clutch ring for moving said ring axially; and said multiple formations on said ring matingly engaged with said multiple formations on said other of said wheel hub and said axle when said ring is moved axially to couple said ring to said other of said wheel hub and said axle for cooperative mutual driving engagement between all of said multiple formations on said ring and all of said multiple formations on said other of said wheel hub and said axle.

7. A clutch mechanism as defined in claim 6 wherein the shift mechanism includes a first spring positioned to urge the clutch ring into engagement, and an actuating member for selectively compressing the first spring and generating an applied force to urge engagement of the first and second tandem formations when the formations are in alignment.

8. A clutch mechanism as defined in claim 7 wherein the shift mechanism includes a second spring positioned to urge the clutch ring into disengagement, said actuating member and first spring overcoming the urging of said second spring, and said second spring overcoming the urging of the first spring in absence of said actuating member compressing said first spring.

9. A clutch mechanism as defined in claim 8, wherein a fixed portion of the vehicle supports the rotatable hub and rotatable axle, said fixed portion having a fixed cylindrical outer surface, and wherein said shift mechanism further includes:

a cam mechanism as the actuating member, said cam mechanism comprising a cam follower axially slidable and rotatively fixed relative to said axle;

a fixed cam actuator mounted to said fixed portion forcing axial movement of the cam follower along said axle when the axle is rotated; and a resistively rotatable cam actuator, a cylindrical ring portion provided as part of said resistively rotatable cam actuator with said ring portion in frictional engagement with the cylindrical outer surface of said fixed portion, said cylindrical ring portion being split to permit increased closing of said ring portion around said surface, and means urging closure of said ring portion for frictional gripping of the ring portion to said fixed cylindrical outer surface, said rotatable cam actuator urging axial movement of said cam follower in spaced relation to said fixed cam actuator and maintaining said spaced relation while said rotatable actuator is resistively rotated about said cylindrical outer surface.

10. A clutch mechanism for a four wheel drive vehicle comprising:

a rotatable axle rotatively mounted to the vehicle;

a rotatable hub surrounding said axle;

a clutch ring moveable between a first position and a second position relative to the axle and hub for coupling said axle and hub in said first position and decoupling said axle and hub in said second position;

an actuating mechanism for selectively positioning said clutch ring between said first and second positions, said actuating mechanism including a fixed cam actuator fixedly mounted to said vehicle, a resistively rotatable cam actuator, and a cam follower, said cam follower rotatively fixed to said rotatable axle whereby rotation of the axle and thereby rotation of the follower forces axial sliding of the follower to urge the clutch ring to the first position, and said rotatable cam actuator engaging said cam follower to urge and maintain a spacing between said follower and said fixed cam actuator; and a member fixedly mounted to said vehicle having a cylindrical outer bearing surface, said resistively rotatable cam actuator including an integral friction shoe that substantially surrounds the cylindrical surface and is closable against said cylindrical surface, and biasing means urging said friction shoe to close against and into frictional engagement with said bearing surface to resist rotation and thereby urge separation of the follower and fixed cam actuator, while permitting rotation when engaged by said follower to maintain said spacing between the follower and fixed cam.

11. A clutch mechanism as defined in claim 10 wherein the resistively rotatable cam actuator includes a lobed portion, said integral friction shoe and said lobed portion including overlapping fingers defining a common circular channel, and said biasing means being a coil spring residing in the channel and preventing separation of the friction shoe from the lobed portion.

12. A clutch mechanism as defined in claim 6 wherein said shift mechanism is a manual mechanism, said manual mechanism actuated manually to effect axial movement of said clutch ring.

13. A clutch mechanism as defined in claim 6 wherein said shift mechanism is an automatic mechanism, said automatic mechanism actuated automatically to effect axial movement of said clutch ring.

14. A clutch mechanism for selectively locking a wheel hub and a drive axle of a vehicle for unity of rotation and unlocking said wheel hub and said drive axle for independent rotation comprising:

a wheel hub;

a drive axle received in said wheel hub;

a clutch ring axially movable relative to said wheel hub and said axle, said clutch ring permanently coupled for unity of rotation with one of said wheel hub and said axle, said ring selectively coupled to the other of said wheel hub and said axle to provide unity of rotation, and uncoupled from said other of said wheel hub and said axle to provide independent rotation by axial movement of said ring; and a shift mechanism connected to said clutch ring for moving said clutch ring axially, said shift mechanism including a cage having a base and rails attached at one end to the base and extending from the base and terminating in opposed configured rail ends, said cage surrounding said clutch ring, a first spring between the base and clutch ring within said cage and urging the clutch ring away from the base and toward the configured rail ends, and a second spring outside the cage and acting against the configured rail ends, the configured rail ends configured to receive the second spring which urges movement of the cage and clutch ring in a first direction, and an actuator acting against the base to urge the cage and clutch ring in the opposite direction.

* * * * *